Figure 1:
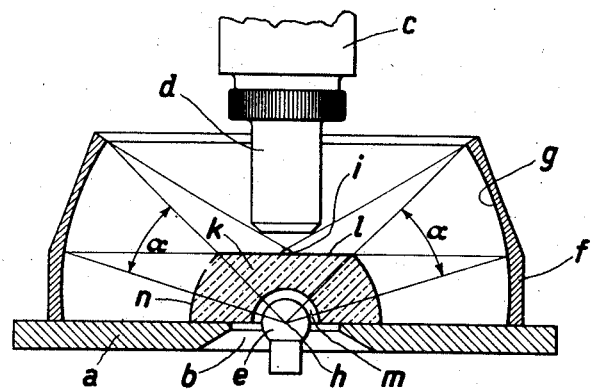

Sept. 26, 1933.                R. STRAUBEL                1,927,854
              DEVICE FOR ILLUMINATING MICROSCOPIC OBJECTS
                         Filed Sept. 21, 1932

Inventor:

Patented Sept. 26, 1933

1,927,854

UNITED STATES PATENT OFFICE 1,927,854

DEVICE FOR ILLUMINATING MICROSCOPIC OBJECTS

Rudolf Straubel, Jena, Germany, assignor to the firm Carl Zeiss, Jena, Germany

Application September 21, 1932, Serial No. 634,175, and in Germany September 10, 1931

7 Claims. (Cl. 88—40)

An application has been filed in Germany, September 10, 1931.

Devices for illuminating microscopic objects in incident light are known which are provided with a source of light and an optical system converging approximately at one point of the object the light rays emanating from the light source. For instance, the rays of a light pencil emanating from the filament of a glowlamp are made parallel by means of a condenser and converged by means of a paraboloid reflector similar to the known Lieuerkühn reflector. Illumination devices of this kind are not very advantageous in so far as with the usual microscopes, which have in the stage a comparatively narrow aperture for the light, only objects of small dimensions may be examined.

The illumination device according to the invention is an annular reflecting body with one single reflecting surface which is a surface of rotation about the axis of the microscope objective. This surface receives the light rays diverged by the light source and directs them to the object, which offers the advantage that also objects may be examined which have dimensions greater than those of the light aperture in the microscope stage. The light source may be a light source proper, for instance a glowlamp or the like, or a light-source image produced by optical means.

If that surface of the reflecting body which faces the light source is the reflecting surface, this surface may be part of an ellipsoid of rotation in the two foci of which are disposed the light source and the object, respectively.

To provide a certain angular space for the passage of light between the surface of the microscope stage and the support surface for the object, that is to say the object stage proper, a small auxiliary stage may be placed on the microscope stage, the plate of this auxiliary stage stopping down the light rays that strike the object in the sense of a transillumination, and the feet of this auxiliary stage permitting the unobstructed passage of the illumination rays to the reflecting body. The object stage may be as well a glass body whose upper surface is plane and which is disposed on the microscope stage, above the source of light. In this case, in order to avoid any influence upon the direction of the light rays traversing this glass body, the light entrance surface as well as the light exit surface are to be spherical surfaces approximately concentric to the light source. This constructional form is more convenient than the one mentioned first in so far as any loss of illumination rays that may be caused by the feet of the auxiliary stage is avoided. Instead of a glass body of this kind, use may be made of a plano-parallel glass plate that is disposed in the reflector body and on which the object is to be placed. In the two latter cases, disturbing rays are avoided either by making opaque the centre of the glass surface supporting the body, or by providing above the light source a corresponding diaphragm. Displacing the objects in their plane, that is to say in a plane at right angles to the tube axis, which as a rule is necessary in microscopic work, may be effected, either by a displacement of the microscope stage constructed accordingly, or, when using for instance a microscope with fixed stage by displacing the auxiliary stage in a corresponding manner, or by making the above-mentioned glass plate displaceable.

Obviously, the light source, the reflecting body and the surface for supporting the object must have definite positions with respect to each other. To provide these positions, the said parts consequently require to be movable relatively to a certain fixed element of the microscope, for instance the microscope stage. It is quite sufficient, however, to make two of these parts movable relatively to the third, in which case, apart from the displacement relative to each other, required for the adjustment, which is effected only once, the two movable parts may be rigidly connected to each other. One of the parts may be rigidly connected to a part movable relatively to the said fixed element of the miscoscope, for instance the reflecting body or the auxiliary stage to the tube or the light source to the upwardly adjustable support of the common illumination apparatus of the microscope.

As is well known, the influence of the air causes very soon a decrease in the reflexion capacity of surface reflectors. For this reason the preference often is to be given to a transparent reflecting body with two surfaces of rotation, the surface not facing the light source being used as a reflecting surface. As in this case both surfaces are optically effective and, on the other hand, as the manufacture of aspherical surfaces of rotation with a meridional curve departing from the circular form, which are specially required, is more costly than that of surfaces of rotation with circular meridional curve, it is advisable to give at least one of the surfaces a circular meridional curve. The meridional curve of the other surface is determined accordingly in such a manner that the effect of both surfaces conjointly at least approximates that of a corresponding elliptic reflector. In the case of surfaces with circular meridional surface toric or spherical surfaces are concerned. Without doubt, the manufacture is most simple when one of the surfaces is spherical. If the preference is not given to that constructional form in which the reflecting surface not facing the light source is spherical, and if value is attached to the slightest possible differences in the thickness of the reflecting body along the meridional curve, the surface facing the light source is to be spherical.

In all constructional forms of the new illumination device, it rests with the manufacturer which part of the entire surface of rotation is to be used as an annular reflector. It is, therefore, not at all necessary to use a ring separated from the surface of rotation by two sections at right angles to the axis of rotation. On the contrary, these sections may have any direction relative to the axis of rotation and need not be parallel to each other nor plane.

Figure 2:
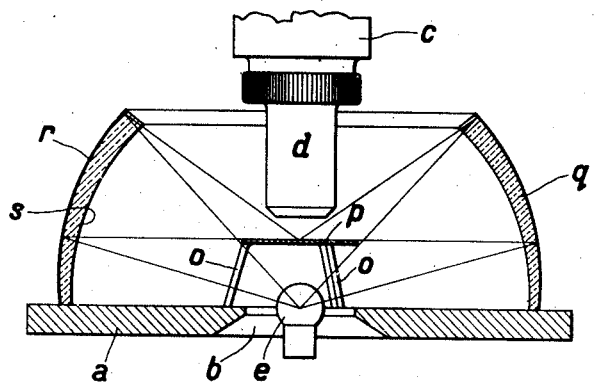

Figures 1 and 2 of the accompanying drawing schematically represent central sections, in elevation, of two constructional examples of the invention.

In these two constructional examples, $a$ is a microscope stage having an aperture $b$ for the passage of light, and $c$ the tube of a microscope of the usual construction. To the tube $c$ is fixed a microscope objective $d$. A small glowlamp $e$ serves as a light source for the illumination device. The light source $e$ is disposed in the aperture $b$ in the microscope stage $a$.

In the first example (Figure 1), the reflector is a metal reflector $f$ whose interior, reflecting, surface $g$ is part of an ellipsoid of rotation the two foci $h$ and $i$ of which are in the light source $e$ and above this light source, at the place of the object to be examined, respectively. On the microscope stage is placed an auxiliary stage $k$, which is a glass body having a blackened, and therefore opaque, surface $l$ and a semispherical recess $m$ concentric to the bulb of the glowlamp $e$. The exterior surface $n$ of this glass body $k$ is part of a spherical surface concentric to the recess $m$, the height of the glass body $k$ corresponding to the intermediate distance of the foci $h$ and $i$.

When using the device, the object to be examined is placed on the blackened surface $l$. The light rays emitted by the glowlamp $e$ fall within an angular range $\alpha$ on an annular zone of the reflector $f$. This annular zone converges the said light rays at the focus $i$, that part of the object which lies at this place being intensely illuminated in incident light from all sides.

The second constructional example (Figure 2) differs from the first example by a small auxiliary stage consisting of a plate $p$ provided with three feet $o$, this auxiliary stage being substituted for the glass body $k$, and by a reflecting body $q$ of glass which is substituted for the metal reflector $f$. The exterior surface of the reflecting body $q$, which has a reflecting layer $r$, is part of a spherical surface. The interior surface $s$, which departs from the form of a spherical surface, is so determined that the entire effect of the reflecting body $q$ approximately equals that of the metal reflector $f$.

When using this illumination device, the plate $p$, instead of the surface $l$ of the first example, serves as an object support. Apart from the difference in the ray paths, which is caused by the refraction at the surface $s$, the effect of this device is completely equal to that of the device according to the first example.

I claim:

1. A device for examining microscopic objects in incident light, comprising a microscope, an object stage disposed opposite the microscope objective, the object stage having a central aperture, a source of light extending through this aperture, and an annular reflecting body having only one reflecting surface, the said surface being a surface of rotation, the said reflecting body surrounding the microscope objective, and the axis of the said surface of rotation coinciding with the axis of the microscope objective.

2. A device for examining microscopic objects in incident light, comprising a microscope, an object stage disposed opposite the microscope objective, the object stage having a central aperture, a source of light extending through this aperture, and an annular reflecting body having only one reflecting surface, the said surface being a surface of rotation, the said reflecting body being placed on the object stage surrounding the microscope objective, and the axis of the said surface of rotation coinciding with the axis of the microscope objective.

3. A device for examining microscopic objects in incident light, comprising a microscope, an object stage disposed opposite to the microscope objective, the object stage having a central aperture, a source of light extending through this aperture, and an annular reflecting body containing a single reflecting surface being part of an ellipsoid of rotation, the said reflecting body being placed on the object stage surrounding the microscope objective, and the axis of the said surface of rotation coinciding with the axis of the microscope objective.

4. A device for examining microscopic objects in incident light, comprising a microscope, an object stage disposed opposite to the microscope objective, the object stage having a central aperture, a source of light extending through this aperture, and an annular reflecting body of glass containing a single reflecting surface and being bounded by two surfaces of rotation having a common axis, the exterior of these two surfaces of rotation being silvered and reflective, the meridional curve of at least one of these surfaces of rotation being a circular arc, the said reflecting body being placed on the object stage surrounding the microscope objective, and the axis of the said reflecting surface coinciding with the axis of the microscope objective.

5. A device for examining microscopic objects in incident light, comprising a microscope, an object stage disposed opposite to the microscope objective, the object stage having a central aperture, a source of light extending through this aperture, and an annular reflecting body of glass containing a single reflecting surface and being bounded by two surfaces of rotation having a common axis, the exterior of these two surfaces of rotation being silvered and reflective the meridional curve of at least one of these surfaces of rotation being a circular arc, one of the said two surfaces of rotation being a spherical surface, the said reflecting body being placed on the object stage surrounding the microscope objective, and the axis of the said reflecting surface coinciding with the axis of the microscope objective.

6. A device for examining microscopic objects in incident light, comprising a microscope, an object stage disposed opposite the microscope objective, the object stage having a central aperture, a source of light extending through this aperture, an annular reflecting body having only one reflecting surface, the said surface being a surface of rotation, the said reflecting body surrounding the microscope objective, and the axis of the said surface of rotation coinciding with the axis of the microscope objective, and a glass body placed on the object stage and surrounding with a spherical cavity the light source, the exterior bounding surface of this body being spherical and concentric to the said cavity, and the body being plane on its upper side.

7. A device for examining microscopic objects in incident light, comprising a microscope, an object stage disposed opposite the microscope objective, the object stage having a central aperture, a source of light extending through this aperture, an annular reflecting body having only one reflecting surface, the said surface being a surface of rotation, the said reflecting body surrounding the microscope objective, and the axis of the said surface of rotation coinciding with the axis of the microscope objective, and a small stage disposed on the object stage, above the source of light.

RUDOLF STRAUBEL.